United States Patent
Xu (10) Patent No.: US 9,071,656 B2
(45) Date of Patent: Jun. 30, 2015

(54) ROUTER AND METHOD FOR ROUTING SERVICE

(75) Inventor: Wenhua Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 864 days.

(21) Appl. No.: 13/219,159

(22) Filed: Aug. 26, 2011

(65) Prior Publication Data

US 2011/0310902 A1    Dec. 22, 2011

Related U.S. Application Data

(63) Continuation of application No. PCT/CN2009/075358, filed on Dec. 7, 2009.

(30) Foreign Application Priority Data

Feb. 27, 2009   (CN) .......................... 2009 1 0105676

(51) Int. Cl.
*H04L 12/28* (2006.01)
*H04L 29/08* (2006.01)

(52) U.S. Cl.
CPC .............. *H04L 67/327* (2013.01); *H04L 67/16* (2013.01); *H04L 67/2814* (2013.01)

(58) Field of Classification Search
None
See application file for complete search history.

(56) References Cited

U.S. PATENT DOCUMENTS

| | | | | |
|---|---|---|---|---|
| 6,970,941 | B1 * | 11/2005 | Caronni et al. | 709/238 |
| 2003/0028642 | A1 * | 2/2003 | Agarwal et al. | 709/226 |
| 2004/0078481 | A1 * | 4/2004 | Rudd et al. | 709/238 |
| 2004/0143570 | A1 * | 7/2004 | Klock et al. | 707/3 |
| 2004/0193677 | A1 * | 9/2004 | Dar et al. | 709/203 |
| 2006/0059029 | A1 * | 3/2006 | Chalasani et al. | 705/8 |
| 2006/0168553 | A1 * | 7/2006 | Drennan | 717/100 |
| 2006/0270404 | A1 | 11/2006 | Tuohino et al. | |
| 2007/0008974 | A1 | 1/2007 | Dispensa et al. | |
| 2007/0153681 | A1 * | 7/2007 | Steeb et al. | 370/229 |
| 2007/0266377 | A1 * | 11/2007 | Ivanov | 717/136 |
| 2008/0003915 | A1 | 1/2008 | Jeon | |
| 2008/0060082 | A1 | 3/2008 | Matthews et al. | |

FOREIGN PATENT DOCUMENTS

| | | |
|---|---|---|
| CN | 1838610 A | 9/2006 |
| CN | 101079901 A | 11/2007 |
| CN | 101094224 A | 12/2007 |
| WO | WO 2008/003915 A2 | 1/2008 |
| WO | WO 2008/088954 A2 | 7/2008 |

OTHER PUBLICATIONS

Written Opinion dated Mar. 11, 2010 in connection with International Patent Application No. PCT/CN2009/075358.

(Continued)

*Primary Examiner* — Hassan Phillips
*Assistant Examiner* — Gautam Sharma (57) ABSTRACT

A routing method, apparatus and system are disclosed. The method includes: receiving from a service provider a service registration request which carries a service logical address, a service physical address, and a message rule; registering routing information according to the service registration request; and routing a request message of a service requestor according to the routing information. The present invention enables routing of the request message of a service requestor according to the service logical address, service physical address, and message rule, so that routing is more flexible and more convenient.

6 Claims, 4 Drawing Sheets

(56) References Cited

OTHER PUBLICATIONS

International Search Report dated Mar. 11, 2010 in connection with International Patent Application No. PCT/CN2009/075358.

Partial translation of Office Action dated Mar. 20, 2012 in connection with Chinese Patent Application No. 200910105676.6.

Communication (extended European search report) dated Jan. 31, 2012 issued in connection with European Application No. 09840658.0.

* cited by examiner

ROUTER AND METHOD FOR ROUTING SERVICE

CROSS-REFERENCE TO RELATED APPLICATIONS

This application is a continuation of International Application No. PCT/CN2009/075358, filed on Dec. 7, 2009, which claims priority to Chinese Patent Application No. 200910105676.6, filed on Feb. 27, 2009, both of which are hereby incorporated by reference in their entireties.

TECHNICAL FIELD

The present invention relates to the field of communications technologies, and in particular, to a method, a system, and an apparatus for personalized routing.

BACKGROUND

A service network provides a technical framework to normalize the interaction between services and reduce the complexity of an entire service interaction process, so that the interaction between services is easy and efficient. The service network is an independent network laid over an infrastructure physical network and provides a series of functional entities, including a service router, a service registration center, a service directory, and a composite engine. The service network makes the interaction between services convenient and efficient and provides a uniform, efficient and secure collaborative working environment for the next generation services and therefore enhances the interoperability and collaboration between services.

The core of a service network is a service router, which routes and addresses services and ensures the interaction between functional entities in the service network. In addition to normal service routing, the service network supports intelligent routing, for example, routing according to service key words.

SUMMARY

Embodiments of the present invention provide a routing method, a routing system, a routing apparatus, and a routing information registering method.

A routing method includes: receiving from a service provider a service registration request which carries a service logical address, a service physical address, and a message rule; registering routing information according to the service registration request; and routing a request message of a service requestor according to the routing information.

A routing method includes: sending a service registration request that carries a service logical address, a service physical address, and a message rule to a home service router, so that the home service router registers routing information according to the service registration request and routes a request message of a service requestor; and receiving the request message of the service requestor routed by the home service router.

A routing system includes: a home service router, configured to receive a service registration request of a service provider and route a request message sent by a service requestor according to the service registration request; and a service provider, configured to send a service registration request to the home service router, where the service registration request carries a service logical address, a service physical address, and a message rule, and receive the request message of the service requestor routed by the home service router.

A router includes: a receiving unit, configured to receive from a service provider a service registration request which carries a service logical address, a service physical address, and a message rule; a registering unit, configured to register routing information according to the service registration request; and a routing unit, adapted to route a request message of a service requestor according to the routing information.

A service provider device includes: a sending unit, configured to send a service registration request message that carries a service logical address, a service physical address, and a message rule to a home service router, so that the home service router registers routing information according to the service registration request and routes a request message of a service requestor; and a route receiving unit, configured to receive the request message of the service requestor routed by the home service router.

In the embodiments of the present invention, a service registration request that carries a service logical address, a service physical address and a message rule is received from a service provider; routing information is registered according to the service registration request; and the request message of the service requestor is routed according to the routing information. Therefore, routing of the request message of a service requestor according to the service logical address, service physical address and message rule may be implemented, so that routing is more flexible and more convenient.

BRIEF DESCRIPTION OF THE DRAWINGS

To make the technical solutions in the embodiments of the present invention or in the prior art clearer, the accompanying drawings for illustrating the embodiments of the present invention or the prior art are described below. Evidently, the accompanying drawings are exemplary, and those skilled in the art may derive other drawings from the accompanying drawings without creative efforts.

DETAILED DESCRIPTION

To make the present invention clearer to those skilled in the art, the present invention is described in detail with reference to the embodiments and the accompanying drawings. Apparently, the embodiments described herein are only some exemplary embodiments of the present invention and the present invention is not limited to such embodiments. Based on the embodiments herein, those skilled in the art may derive other embodiments without creative efforts and those embodiments all fall into the protection scope of the present invention.

Figure 1:
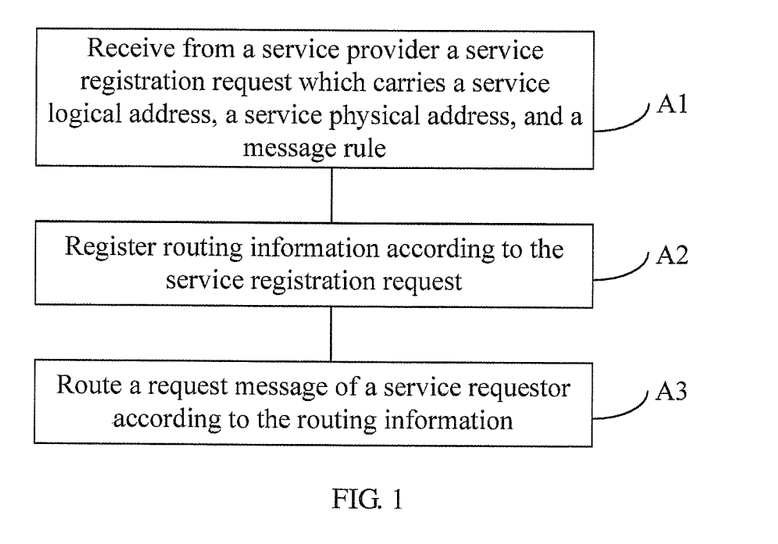
FIG. 1 illustrates a basic process of a routing method in a first embodiment of the present invention.

FIG. 1 illustrates a basic process of a service routing method in an embodiment of the present invention. The method includes the following steps:

A1. Receive from a service provider a service registration request which includes a service logical address, a service physical address, and a message rule.

The service provider sends the service registration request to a home service router. The service registration request may carry a message rule which includes at least one of the following parameters: message format and message content (that is, message field), where the message format may be described by a schema and the message content may be described by a key-value pair. When the service registration request is forwarded by a visited router, the service registration request may further include information of the visited router. For example, the logical identifier of a tour service is A, the identifiers of the three messages to be received for the service are B, C and D, and the message format corresponding to the message identifier B is E. Optionally, E carries a specific message content whose key-value pair is F and H. One service has one service logical address. One service logical address may match multiple service physical addresses. One service physical address matches one visited router. Therefore, the service logical address of the above tour service is etour@huawei.com and the two service physical addresses corresponding to the logical address are etour@10.1.1.1 and etour@20.1.1.1. The visited router matching etour@20.1.1.1 is R2 and the visited router matching etour@10.1.1.1 is R1.

A2. Register routing information according to the service registration request.

The registered routing information may exist in a registering module inside the router or a registering module outside the router.

The service registration request may further carry at least one of the following parameters: service instance identifier and message identifier. After the home service router receives the service registration request, the home service router registers routing information according to the service registration request. This includes the following scenarios:

1. Adding Routing Information

After receiving the service registration request, if the message rule is not null, the home service router may further extract the service logical address, service physical address, service instance identifier, message identifier, and message rule in the service registration request and add them as routing information to a routing table. The message rule includes at least one of the following parameters: message format and message content. If the service registration request is forwarded by the visited router, the home service router shall also extract information of the visited router.

The routing table may include multiple routing information records. A routing information record includes a service logical address, a service physical address, a visited router, a service instance identifier, a message identifier, and a message rule.

2. Deleting Routing Information

If the service registration request carries only the service logical address and service physical address, the home service router deletes the routing information corresponding to the service logical address and the service physical address from the locally stored routing table.

If the service registration request carries only the service logical address, service physical address, and service instance identifier, the home service router deletes the routing information corresponding to the service logical address, service physical address, and service instance identifier from the locally stored routing table.

If the service registration request carries only the service logical address, service physical address, service instance identifier, and message identifier, the home service router deletes the routing information corresponding to the service logical address, service physical address, service instance identifier, and message identifier from the locally stored routing table.

A3. Route the request message of the service requestor according to the routing information.

After the home service router of the service provider receives the request message from the service requestor, the home service router routes the request message. This procedure includes the following steps:

1. The service network routes the request message to the home service router of the service provider according to the service logical address in the request message sent by the service requestor.

2. The home service router of the service provider queries its local routing table according to the service logical address in the request message to obtain the routing information record list corresponding to the service logical address. If the record is null, the home service router routes the message according to a policy and the procedure is ended.

3. The home service router of the service provider traverses the routing record list according to the received request message and matches the message rule according to a policy. If the matching is performed according to the message format, the home service router obtains the routing information record list that matches the message format by screening according to the message format; if the matching is performed according to the message content, the home service router obtains the routing information record list that matches the message content by screening according to the message content; if the matching is performed according to both the message format and the message content, the home service router obtains the routing information record list that matches both the message format and the message content by screening according to the message format and the message content.

When comparing the message format, if the message format is described by a schema, the home service router only needs to judge whether the request message matches the schema description and considers that the message format is matched if the received request message matches the schema description.

When comparing the message content, if all key-value pairs in the message content match the received message, the home service router considers that the message content in the record matches the received message content.

An example of matching according to both the message format and the message content is as follows: One record includes a message format described by a schema and a message content of multiple key-value pairs. For example, a key-value pair is made up of a key "name" and a value "username" and another key-value pair is made up of a key "company" and a value "companyname". After confirming that the message format of the request message matches the schema description, that is, after confirming that the message is matched, the home service router continues to compare the message content in the record. The home service router first checks whether the received message has a key "name" with a value "username" according to the first key-value pair. If the first key-value pair is matched, the home service router continues to compare other key-value pairs. If all key-value pairs are matched, the home service router considers that the message content is matched.

4. The home service router of the service provider screens out a routing record list that matches the message content and selects a record according to a policy. The policy here may include load information or tariff information of the service provider.

5. The home service router of the service provider judges whether the selected routing record list includes information of the visited router. If the information is found, the procedure goes to step 6; if the information is not found, the procedure goes to step 8.

6. The home service router of the service provider extracts the service physical address corresponding to the service provider and adds the address to the received request message. The home service router extracts the visited router information corresponding to the service provider and routes the request message that carries the service physical address to the visited router according to the visited router address.

7. The visited router of the service provider routes the message according to the service physical address in the request message. The procedure is ended.

8. The home service router of the service provider routes the request message according to the service physical address in the routing record. The procedure is ended.

In the embodiment of the present invention, a service registration request that carries a service logical address, a service physical address and a message rule is received from a service provider; routing information is registered according to the service registration request; and the request message of the service requestor is routed according to the routing information. Therefore, routing of a request message of the service requestor according to the service logical address, service physical address and message rule may be implemented, so that routing is more flexible and more convenient.

Figure 2:
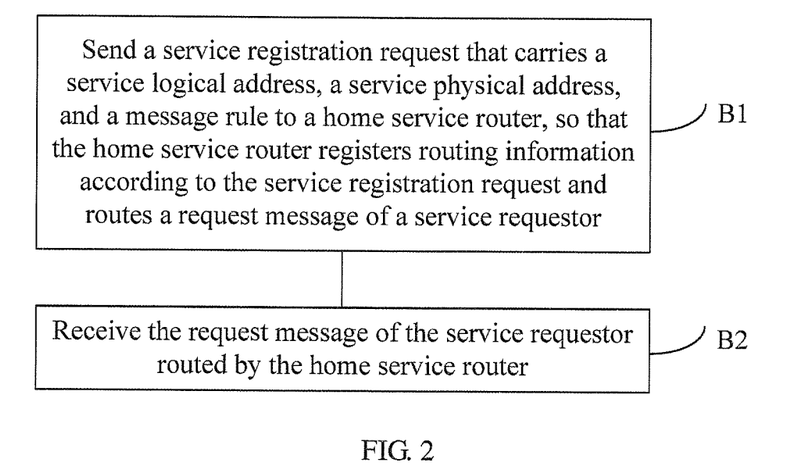
FIG. 2 illustrates a basic process of another routing method in a second embodiment of the present invention.

FIG. 2 illustrates a basic process of a routing information registering method for a service provider in an embodiment of the present invention. The method includes the following steps:

B1. Send a service registration request that carries a service logical address, a service physical address, and a message rule to a home service router. The message rule includes at least one of the following parameters: message format and message content, so that the home service router registers routing information according to the service registration request and routes the request message of the service requestor.

Optionally, the service provider sends a service registration request to the visited router. If the visited router is not the home service router of the service provider, the visited router adds its own address to the service registration request and forwards the service registration request to the home service router of the service provider according to the service logical address.

The process where the service provider sends the service registration request to the home service router includes two scenarios: adding routing information and deleting routing information.

In the scenario of adding routing information, the process where the service provider sends the service registration request to the home service router includes:

1. The procedure for adding routing information is triggered as follows:

When the service is being loaded, routing information corresponding to activities that are able to create service instances need to be added to the service router; or during the execution of the service, when a certain activity such as receive, onMessage or onEvent is executed and waiting for receiving messages, routing information corresponding to the activity need to be added.

2. The service provider judges whether the service is being loaded. If the service is being loaded, the procedure goes to step 3; if the service is not being loaded, the procedure goes to step 4.

3. The service provider extracts a message activity that is able to create a service instance. That is, the service provider extracts a message activity where the value of createInstance in the service logic is "yes". The procedure continues with step 5.

4. The service provider extracts an activity that is being executed and waiting for receiving a message.

5. The service provider extracts a unique message identifier of the activity in the service logic script. The message identifier may be described by an xpath corresponding to the activity element.

6. The service provider extracts the message rule corresponding to the message activity. If only the message format is found, the service provider extracts the message format as the message rule; if only the message content is found, the service provider extracts the corresponding message content as the message rule; if both the message format and the message content are found, the service provider extracts both the message format and the message content as the message rule.

A. The service provider judges whether message format information exists. If the message format information exists, the service provider extracts the message format corresponding to the message activity. The procedure for extracting message format information is described below, where generation of a message format is explained by taking a schema as an example.

(a) Obtain partnerLink and operation information according to the specific activity in the composite service logic script.

(b) Query partnerLinks elements in the composite service logic script according to the value of partnerLink to obtain a partnerLink element which includes such attributes information as myRole and partnerLinkType.

(c) Obtain the partnerLinkType element according to the QName of the value of the partnerLinkType attribute.

(d) Query the sub-element role of the obtained partnerLinkType element according to the value of myRole, and obtain a role element whose attribute is the value of myRole.

(e) Extract the portType information in the obtained role element.

(f) Obtain the message element corresponding to the input according to the portType and operation information. The element information includes the corresponding message description.

(g) Select a soap binding corresponding to the portType according to the portType and operation information in the service description information and obtain the style, user, and namespace information in binding.

(h) Create a message format according the obtained message description and style, use, and namespace. The message format may be described by a schema.

B. The service provider judges whether any message content exists. If the message content exists, the service provider extracts the message content corresponding to the message activity. The procedure for extracting the message content is as follows:

If the activity has a corresponding correlations element and the set attribute in the correlation sub-element is not null, there is a message content. Otherwise, the message content extracting procedure is ended.

Obtain the corresponding correlationSet element list according to all non-null set attributes corresponding to the activity.

Obtain the corresponding properties list according to the correlationSet element list.

Obtain the corresponding property list according to the properties list.

A corresponding propertyAlias list can be obtained for each property. A specific propertyAlias is obtained according to the obtained element message.

For each propertyAlias in the obtained propertyAlias list, a specific field is determined according to the messageType, part and query, and an xpath can be used to locate the specific field. The value corresponding to the property is the value of the specific field.

7. The service provider sends a service registration request to the service router and extracts the logical address and physical address of the composite service. In the case of a service-instance-creating activity, the value of the service instance identifier is 0; if it is not a service-instance-creating activity, the value of the service instance identifier is the true instance identifier of the activity. The service provider sends the service registration request with the extracted message identifier and message rule to the service router and adds the routing information. The service registration request carries the service logical address, service physical address and message rule. The service registration request may further include the following parameters: the service instance identifier and message identifier.

In the scenario of deleting routing information, the process where the service provider sends the service registration request to the home service router includes:

When the service is unloaded, all routing information corresponding to the service provider, including all routing information corresponding to the service instances need to be deleted from the home service router. Or, during the execution of the service, when activities (including receive, onMessage, and onEvent) that are waiting for receiving messages no longer need to be executed, or when an activity (other than an activity whose createProcess attribute is "yes") that is waiting for receiving messages receives a message, the corresponding routing information need to be deleted.

When the service provider is unloading a service, the service provider extracts the service logical address and service physical address.

When the service provider is ending a service instance, the service provider extracts the service logical address, service physical address, and instance identifier.

When the service provider is ending a message activity, the service provider extracts information corresponding to the activity. The information includes the service logical address, service physical address, service instance identifier, and message identifier.

8. The service provider sends the service registration request to the service router and deletes the routing information. That is, when the service registration request carries the service instance identifier and/or message identifier rather than the message format or message content, the routing information is deleted.

B2. Receive the request message of the service requestor routed by the home service router.

Receive the request message sent by the service requestor and routed by the home service router. For the specific routing procedure, it may be referred to the related steps in A2.

In the embodiment of the present invention, a service registration request that carries a service logical address, a service physical address and a message rule is sent to the home service router, so that the home service router may register routing information according to the service registration request and route the request message of the service requestor. Therefore, routing of a request message of the service requestor according to the service logical address, service physical address and message rule may be implemented, so that routing is more flexible and more convenient.

Figure 3:
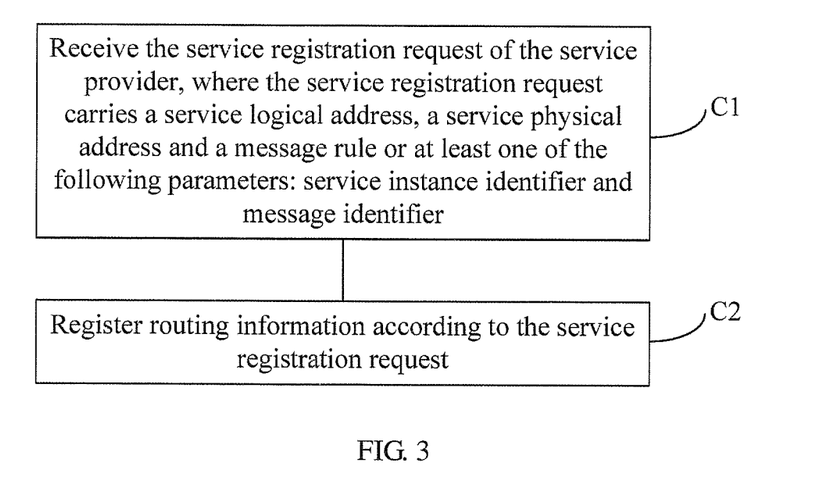
FIG. 3 illustrates a basic process of a routing information registering method in a third embodiment of the present invention.

FIG. 3 illustrates a basic process of a routing information registering method in an embodiment of the present invention. The method includes the following steps:

C1. Receive a service registration request of a service provider. The service registration request carries a service logical address, a service physical address, and a message rule or at least one of the following parameters: service instance identifier and message identifier. The message rule includes at least one of the following parameters: message format and message content.

C2. Register routing information according to the service registration request.

The step C2 includes four scenarios:

If the message rule of the service registration request is not null, the service logical address, service physical address, service instance identifier, message identifier, and message rule in the service registration request are extracted as new routing information.

If the service registration request carries only the service logical address and service physical address, the routing information corresponding to the service logical address and service physical address is deleted.

If the service registration request carries only the service logical address, service physical address, and service instance identifier, the routing information corresponding to the service logical address, service physical address, and service instance identifier is deleted.

If the service registration request carries only the service logical address, service physical address, service instance identifier and message identifier, the routing information corresponding to the service logical address, service physical address, service instance identifier and message identifier is deleted.

In the embodiment of the present invention, a service registration request is received from a service provider and routing information is registered according to the service registration request. Therefore, registration of the routing information according to the service logical address, service physical address, and message rule may be implemented, and the request message of the service requestor can be routed according to the registered routing information, so that routing is more flexible and more convenient.

Figure 4:
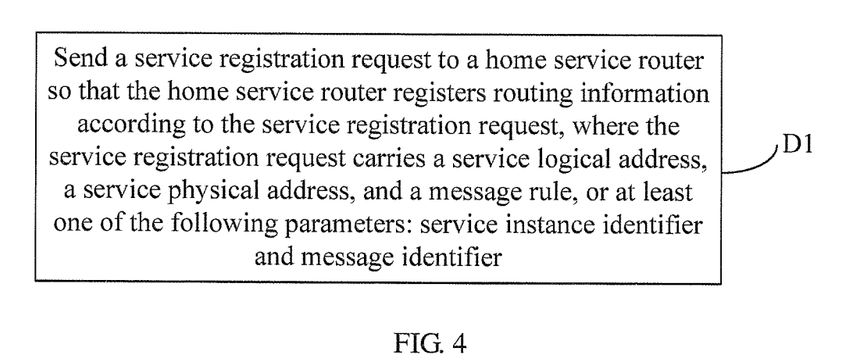
FIG. 4 illustrates a basic process of another routing information registering method in a fourth embodiment of the present invention.

FIG. 4 illustrates a basic process of another routing information registering method in an embodiment of the present invention. The method includes the following steps:

D1. Send a service registration request to a home service router, so that the home service router registers routing information according to the service registration request. The service registration request carries a service logical address, a service physical address, and a message rule, or at least one of the following parameters: service instance identifier and message identifier. The message rule includes at least one of the following parameters: message format and message content.

This step includes the following scenarios:

When it is determined that the service is being loaded, a message activity that is able to create a service instance is extracted, the unique message identifier of the message activity in the logic script of the service is obtained, and the corresponding service instance identifier is obtained.

When it is determined that the service is being executed and waiting for receiving a message, the message activity that is waiting for receiving a message is extracted, the unique message identifier of the message activity waiting for receiving a message in the logic script of the service is obtained, and the corresponding service instance identifier is obtained.

When it is determined that the service is being unloaded, the service logical address and service physical address of the service are extracted as the information of the service registration request.

When it is determined that the execution of a service instance is completed, the service logical address, service physical address, and service instance identifier of the service are extracted as the information of the service registration request.

When the activity of a single service is being deleted, the service logical address, service physical address, service instance identifier, and message identifier are extracted as the information of the service registration request.

In the embodiment of the present invention, a service registration request is sent to a home service router, so that the home service router may register routing information according to the service registration request. Therefore, registration of the routing information according to the service logical address, service physical address, and message rule may be implemented, and the request message of the service requestor can be routed according to the registered routing information, so that routing is more flexible and more convenient.

Figure 5:
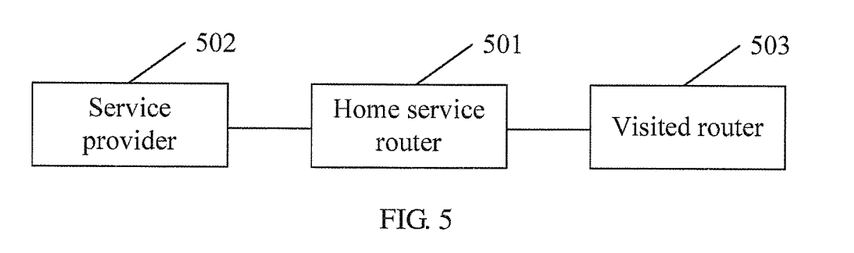
FIG. 5 illustrates a basic structure of a routing system in a fifth embodiment of the present invention.

FIG. 5 illustrates a routing system in an embodiment of the present invention. The system includes:

a home service router 501, configured to receive a service registration request of a service provider and route a request message sent by a service requestor according to the service registration request; and a service provider 502, configured to send the service registration request to the home service router, where the service registration request carries a service logical address, a service physical address, and a message rule which includes at least one of the following parameters: message format and message content, and receive the request message of the service requestor routed by the home service router.

The service registration request further includes at least one of the following parameters: service instance identifier and message identifier.

The system further includes a visited router 503, configured to: send the service registration request message of the service provider to the home service router and add the information of the visited router to the service registration request message, and route the request message of the service requestor to the service provider corresponding to the visited router.

In routing system provided in the embodiment of the present invention, a home service router receives a service registration request that carries a service logical address, a service physical address and a message rule from a service provider and routes the request message of a service requestor according to the service registration request. Therefore, routing of a request message of the service requestor according to the service logical address, service physical address and message rule may be implemented, so that routing is more flexible and more convenient.

Figure 6:
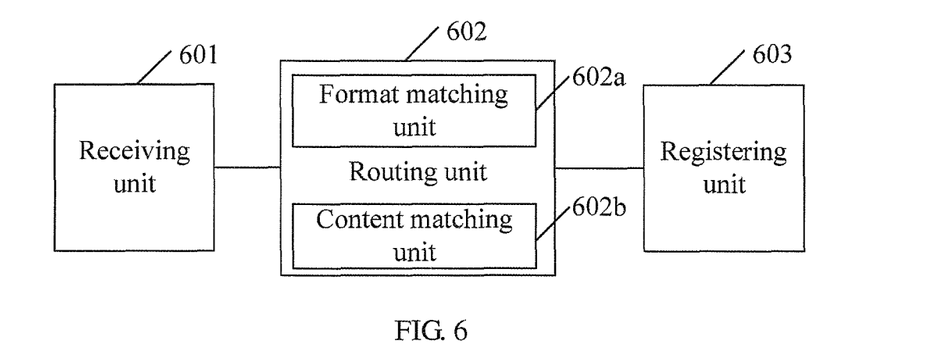
FIG. 6 illustrates a basic structure of a router in a sixth embodiment of the present invention.

FIG. 6 illustrates a router in an embodiment of the present invention. The router includes:

a receiving unit 601, configured to receive a service registration request of a service provider, where the service registration request carries a service logical address, a service physical address, and a message rule which includes at least one of the following parameters: message format and message content;

a routing unit 602, configured to route a request message of a service requestor according to the service registration request; and a registering unit 603, configured to register routing information according to the service registration request.

The routing unit 602 is capable of the message rule matching function. It further includes:

a format matching unit 602a, configured to match the message format of the request message with the message format of the routing information; and a content matching unit 602b, configured to match the message content of the request message with the message content of the routing information.

The router provided in the embodiment of the present invention receives a service registration request that carries a service logical address, a service physical address and a message rule from a service provider and routes the request message of a service requestor according to the service registration request. Therefore, routing of a request message of the service requestor according to the service logical address, service physical address and message rule may be implemented, so that routing is more flexible and more convenient.

Figure 7:
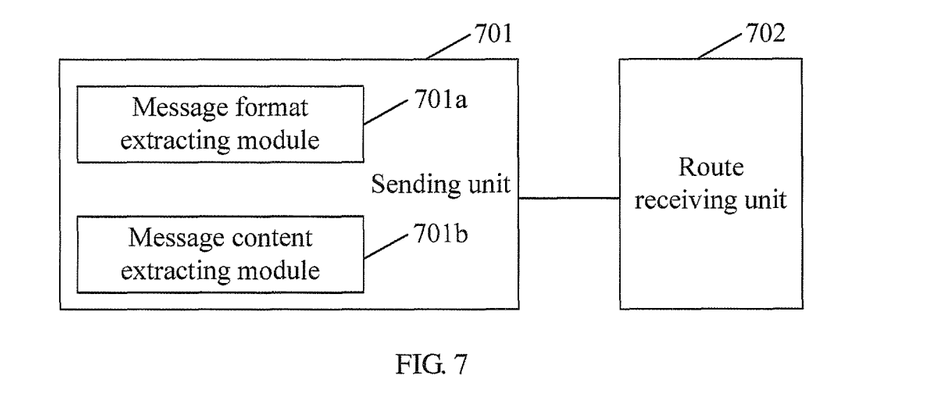
FIG. 7 is a basic block diagram of a service provider in a seventh embodiment of the present invention.

FIG. 7 illustrates a service provider in an embodiment of the present invention. The service provider includes:

a sending unit 701, configured to send a service registration request message to a home service router, so that the home service router registers routing information according to the service registration request and routes the request message of a service requestor, where the service registration request carries a service logical address, a service physical address, and a message rule which includes at least one of the following parameters: message format and message content; and a route receiving unit 702, configured to receive the request message of the service requestor routed by the home service router.

The service registration request further includes at least one of the following parameters: service instance identifier and message identifier.

The sending unit 701 is capable of the message rule extracting function. It further includes:

a message format extracting module 701a, configured to extract message elements corresponding to a message activity and obtain the corresponding message format according to the message elements and service description information; and a message content extracting module 701b, configured to locate a specific field of the message according to key in the message elements to obtain the value of the specific field.

The service provider provided in the embodiment of the present invention sends a service registration request message to the home service router, so that the home service router registers routing information according to the service registration request and routes the request message of a service requestor, so that routing is more flexible and more convenient.

Figure 8:
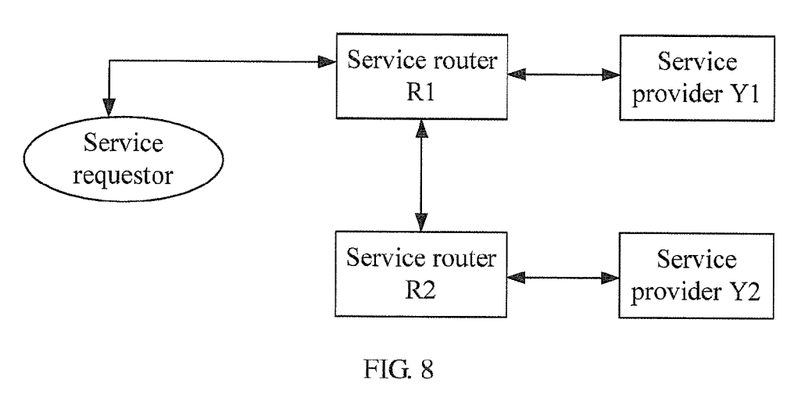
FIG. 8 is a basic block diagram of a service routing method in an eighth embodiment of the present invention.

For a better understanding of the embodiments of the present invention, a specific implementation process of the routing method is described as follows. The service logical address of a composite service is etour@huawei.com, and the service is loaded in two locations, corresponding to two service providers, Y1 and Y2. The physical address of Y1 is etour@10.1.1.1. The physical address of Y2 is etour@20.1.1.1. As shown in FIG. 8, the system includes a service router R1, a service router R2, and a service provider. The visited router and home service router of Y1 are both R1, the visited router of Y2 is R2, and the home service router of Y2 is R1.

The composite service is a tour service. A segment of its logic script is as follows:

```
        <bpws:partnerLinks>
            <bpws:partnerLink myRole="eTourService"
name="eTourPL" partnerLinkType="ns1:eTourPLT"/>
        </bpws:partnerLinks>
        <bpws:correlationSets>
            <bpws:correlationSet         name="CS1"
properties="ns:propertyId"/>
        </bpws:correlationSets>
        <bpws:receive   createInstance="yes"   name="RCV-Login"
operation="Login"  partnerLink="eTourPL"  portType="ns1:eTourPT"
variable="loginIn"/>
        [login operation in the composite service script]
        ...
        <bpws:onMessage  operation="Book"  partnerLink="eTourPL"
portType="ns1:eTourPT" variable="bookIn"> [book operation in the
composite service script]
            <bpws:correlations>
                <bpws:correlation initiate="no" set="CS1"/>
            </bpws:correlations>
        </bpws:onMessage>
```

The following is a segment of partnerLinkType description. This segment can be combined with the service description script.

```
        <plnk:partnerLinkType name="eTourPLT">
            <plnk:role name="eTourService">
                <plnk:portType name="tns:eTourPT"/>
            </plnk:role>
        </plnk:partnerLinkType>
```

The following is a segment of the service description script.

```
<s:complexType name="LoginReqType">
    <s:sequence>
        <s:element name="userId" type="s:string"/>
        <s:element name="passwd" type="s:string"/>
    </s:sequence>
</s:complexType>
    <wsdl:message name="LoginSoapIn"> [login request message]
        <wsdl:part name="loginReq" type="pro:LoginReqType"/>
    </wsdl:message>
    <wsdl:message name="BookSoapIn"> [login response message]
        <wsdl:part name=" userId" type="s:string"/>
    </wsdl:message>
    <wsdl:binding              name="eTourServiceBinding"
type="tns:eTourPT">
        <soap:binding                       style="rpc"
transport="http://schemas.xmlsoap.org/soap/http"/>
            <wsdl:operation name="Login">
                <soap:operation style="rpc"/>
                <wsdl:input>
                    <soap:body
xmlns:soap="http://schemas.xmlsoap.org/wsdl/soap/" use="encoded"
encodingStyle="http://schemas.xmlsoap.org/soap/encoding/"/>
                </wsdl:input>
            </wsdl:operation>
        </soap:binding>
    </wsdl:binding>
```

The following is the description segment of property. This segment can be combined with the service description script.

```
        <bpws:property name="propertyId" type="xsd:string"/>
        <bpws:propertyAlias        messageType="tns:BookSoapIn"
part="userId " propertyName="tns: propertyId "/>
        <bpws:propertyAlias messageType="tns:GetSceneInfoSoapIn"
part="userId" propertyName="tns: propertyId "/>
```

The service provider Y2 loads the service in the following procedure:

1. The service provider Y2 extracts an activity whose createInstance attribute value is "yes" in the service logic and extracts the identifier of the activity. The identifier is described by the xpath value of the activity element, "process/sequence/receive". In the composite logic script, only one activity has a createInstance attribute with the value "yes".

```
    <bpws:receive    createInstance="yes"    name="RCV-Login"
operation="Login"  partnerLink="eTourPL" portType="ns1:eTourPT"
variable="loginIn"/>
```

2. When the message rule is extracted, it is assumed that the message format information is extracted before message content information. The service provider may obtain the message format corresponding to the service according to the service logic description and service description information (style, use and namespace besides message).

The obtained message format is described by a schema. An excerpt of the schema is as follows:

```
    <xs:schema    xmlns:xs="http://www.w3.org/2001/XMLSchema"
targetNamespace="http://ngsn.huawei.com/TravelAgent/wsdl/"
elementFormDefault="qualified">
        <xs:element name="Login">
            <xs:complexType>
                <xs:sequence>
                    <xs:element ref="loginReq"/>
                </xs:sequence>
            </xs:complexType>
        </xs:element>
        <xs:element name="loginReq">
        ...
        </xs:element>
        <xs:element name="passwd">
        ...
        </xs:element>
        <xs:element name="userId">
        ...
        </xs:element>
    </xs:schema>
```

3. The service provider Y2 finds that the service has no correlations element and determines that there is no message content.

4. The service provider Y2 sends a service registration request to the visited router R2.

The service instance identifier is 0 without key-value pair and the message rule includes only the message format information. The main information of the service registration request is as follows:

| Service Logical Address | Service Physical Address | Service Instance Identifier | Message Identifier | Message Format |
|---|---|---|---|---|
| etour@huawei.com | etour@20.1.1.1 | 0 | process/ sequence/ receive | & |

5. After the service router R2 receives the service registration request, R2 extracts the service logical address etour@huawei.com in the message. R2 determines that the service router is not the home service router of the service according to the address. R2 adds the address of R2 to the received message and forwards the message to the corresponding home service router R1.

| Service Logical Address | Service Physical Address | Visited Router | Service Instance Identifier | Message Identifier | Message Format |
|---|---|---|---|---|---|
| etour@huawei.com | etour@20.1.1.1 | R2 | 0 | process/sequence/receive | & |

6. After the home service router R1 receives the service registration request, if the message rule is not null, R1 determines that routing information should be added.

7. R1 extracts the message rule information including only message format information, and registers the information. The registered routing information is as follows:

| Service Logical Address | Service Physical Address | Visited Router | Service Instance Identifier | Message Identifier | Message Format | Message Content |
|---|---|---|---|---|---|---|
| etour@huawei.com | etour@20.1.1.1 | R2 | 0 | process/sequence/receive | & | |

When the service provider Y1 loads the service, the registered routing information of R1 is as follows:

| Service Logical Address | Service Physical Address | Visited Router | Service Instance Identifier | Message Identifier | Message Format | Message Content |
|---|---|---|---|---|---|---|
| etour@huawei.com | etour@20.1.1.1 | R2 | 0 | process/sequence/receive | & | |
| etour@huawei.com | etour@10.1.1.1 | | 0 | process/sequence/receive | & | |

Assume the routing policy specifies the following matching priority sequence: matching message format and message content, matching message format, and matching message content.

The service provider visits etour@huawei.com in the following procedure:

(1) The home service router R1 of etour@huawei.com receives a request message, where the request address is etour@huawei.com. The message content is as follows:

```
        <wsdl:Login
soapenv:encodingStyle="http://schemas.xmlsoap.org/soap/encoding/
">
        <loginReq       xsi:type="prof:LoginReqType"
xmlns:prof="http://huawei.com/ngsn/etour/services/profile/">
            <userId xsi:type="xsd:string">NAME</userId>
            <passwd xsi:type="xsd:string">111111</passwd>
        </loginReq>
    </wsdl:Login>
```

(2) R1 queries the routing table according to the service logical address and obtains two routing records. R1 extracts the schema information of the two routing records and matches the schema information with the content of the received message. The two records are both matched.

(3) When matching the message rule, R1 discovers that neither of the key-value pair routing records of the two records includes any message content and therefore chooses to match the message format. R1 selects one of the routing records according to a policy. If etour@20.1.1.1 is less loaded, R1 selects the record of the less-loaded etour@20.1.1.1.

(4) The service router R1 finds that the selected record includes information of the visited router and therefore extracts the physical address etour@20.1.1.1 and the visited router address R2. R1 adds the physical address to the message and routes the message to the visited router R2.

(5) The visited router R2 discovers that the message carries the service physical address and routes the message to the service provider Y2 corresponding to the service physical address etour@20.1.1.1.

(6) After the service provider R2 receives the message, the process/sequence/receive activity changes from "waiting for messages" to "being executed" and the message corresponding to the activity need to be deleted from the service router R1. But because the createProcess corresponding to the activity is "yes", the information need not be deleted. At the same time, the engine creates a new service instance. Assume that the instance identifier is 1.

The procedure for adding routing information is as follows:

(1) Deploy the service on the engine and continue the execution. When the activity process/sequence/pick/onMessage is executed, a routing information registration procedure is triggered. The message identifier is process/sequence/pick/onMessage.

(2) Extract the message rule. Assume that message format information is extracted before message content information. The service provider extracts the message format corresponding to the activity. The extracting the message format includes obtaining the input message BookSoapIn.

(3) The procedure for extracting the message content is as follows: The service provider finds that the activity includes the correlations element and that the set attribute of its sub-elements is "CS1". That is, the corresponding correlationSet element is "CS1".

Obtain the value of properties of the correlationSet element "CSL", "ns1:propertyId".

Obtain one property "ns1:propertyId" according to properties.

Obtain a propertyAlias list according to the property "ns1:propertyId".

```
<bpws:propertyAlias messageType="tns:BookSoapIn"
part="userId" propertyName="tns: propertyId "/>
```

```
<bpws:propertyAlias messageType="tns:GetSceneInfoSoapIn"
part="userId" propertyName="tns: propertyId "/>
```

Select the first propertyAlias record in the obtained BookSoapIn message.

With reference to the service description information, the specific field Book/userId can be obtained and its value is the value of property "ns1:propertyId". Here, the value is assumed to be "username".

(4) The service provider registers routing information with the service router R1. The message rule includes the message format and message content. Here, the obtained service instance identifier is assumed to be 1. The service provider sends a service registration request to the visited router R2. The main information of the request is as follows:

| Service Logical Address | Service Physical Address | Service Instance Identifier | Message Identifier | Message Format | Message Content |
|---|---|---|---|---|---|
| etour@huawei.com | etour@20.1.1.1 | 1 | process/sequence/pick/onMessage | & | Book/userId = "username" |

(5) After the service router R2 receives the service registration request, R2 extracts the service logical address etour@huawei.com in the message. R2 determines that the service router is not the home service router of the service according to the address. R2 adds the address of R2 to the received message and forwards the message to the corresponding home service router R1.

| Service Logical Address | Service Physical Address | Visited Router | Service Instance Identifier | Message Identifier | Message Format | Message Content |
|---|---|---|---|---|---|---|
| etour@huawei.com | etour@20.1.1.1 | R2 | 1 | process/sequence/pick/onMessage | & | Book/userId= "username" |

(6) After the home service router R1 receives the routing information registration request, R1 discovers that the message rule information in the request is not null and therefore determines that routing information should be added.

(7) R1 extracts the message format and message content information in the message rule and adds the information to the routing table. The routing table with added information is as follows:

| Service Logical Address | Service Physical Address | Visited Router | Service Instance Identifier | Message Identifier | Message Format | Key-Value Pair |
|---|---|---|---|---|---|---|
| etour@huawei.com | etour@20.1.1.1 | R2 | 0 | process/sequence/receive | & | |
| etour@huawei.com | etour@10.1.1.1 | | 0 | process/sequence/receive | & | |
| etour@huawei.com | etour@20.1.1.1 | R2 | 1 | process/sequence/pick/onMessage | & | Book/userId= "username" |

A procedure where the service requestor visits etour@huawei.com (an instance of etour@20.1.1.1) is as follows:

(1) The home service router R1 of etour@huawei.com receives a request message, where the request address is etour@huawei.com. The message content is as follows:

```
<wsdl:Book
soapenv:encodingStyle="http://schemas.xmlsoap.org/soap/encoding/
">
        <userId xsi:type="xsd:string">username</sessionId>
        </wsdl:Book>
```

(2) R1 finds three routing table records according to the service logical address and applies a policy to match both the message format and message content to the three records in precedence. R1 extracts the respective schema information of the three records and matches the schema information with the content of the received message. Only one record is matched.

(3) The service router R1 discovers that the record includes message content. R1 queries the received message according to the key "Book/userId" in the key-value pair of the message content and obtains the corresponding value "username" that is consistent with the value in the key-value pair. Therefore, the key-value pair is matched. Because there is only one key-value pair, the message content of this record is matched successfully.

(4) Because only one record meets the requirement, the service router R1 selects the record directly.

(5) The service router R1 discovers that the selected record includes visited router information and therefore extracts the physical address etour@20.1.1.1 and the visited router address R2 in the record. R1 adds the physical address to the message and routes the message to the visited router R2.

(6) The visited router R2 discovers that the message carries the service physical address and routes the message to the service provider Y2 corresponding to the service physical address etour@20.1.1.1.

(7) After the service provider receives the message, the process/sequence/pick/onMessage activity changes from "waiting for messages" to "being executed" and the message corresponding to the activity need to be deleted from the routing table. A routing information deleting procedure is triggered to delete the routing table information corresponding to a single activity.

(8) The service provider extracts information corresponding to the activity.

| Service Logical Address | Service Physical Address | Service Instance Identifier | Message Identifier |
|---|---|---|---|
| etour@huawei.com | etour@20.1.1.1 | 1 | process/sequence/receive |

(9) The service provider sends a service registration request to the visited router R2.

(10) R2 determines that the router is not the home service router of the service according to the service logical address etour@huawei.com, adds the address information of the visited router R2 to the request message, and forwards the message to the corresponding home service router R1.

(11) R1 determines that the routing information of one activity should be deleted because the message carries the service logical address, service physical address, service instance identifier and message identifier but not the message format. The record described by the four fields is deleted from the routing information registration center.

In the embodiment of the present invention, a service registration request that carries the message rule of the service is received from a service provider, where the message rule includes at least one of the following parameters: message format and message content; routing information is registered according to the service registration request; and the request message of a service requestor is routed according to the routing information, so that routing is more flexible and more convenient.

For a better understanding of the embodiments of the present invention, an exemplary implementation process of the routing method is described as follows. In the example, a service router acts as a load balancer. The service logical address of a weather forecast service is weather@huawei.com. The service is loaded onto two engines that respectively correspond to two service providers: Y1 (processing the weather forecast in Shenzhen) and Y2 (processing the weather forecast in Guangzhou). The physical address of Y1 is weather@10.1.1.1 and the physical address of Y2 is weather@20.1.1.1. The visited router and home service router of Y1 and Y2 are both R1. The public addresses of Y1 and Y2 are their service logical addresses. For details, see FIG. 9. This scheme may increase the service capacity with the help of a router.

Figure 9:
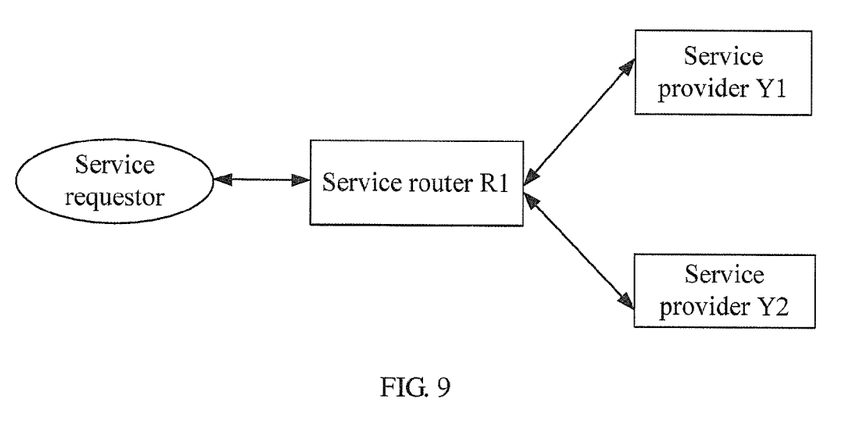
FIG. 9 is a basic block diagram of another service routing method in a ninth embodiment of the present invention.

This embodiment is relative to a sixth embodiment of the present invention. The service provider is directly connected to a home service router without a visited router R2. When routing information is registered, the routing information is sent to the home service router R1 directly without the visited router R2. The request message sent by the service requestor is not forwarded by the home service router R1 to the visited router R2. The other steps are the same and are not described here. See a sixth embodiment for details.

Assume that the message rule of weather@huawei.com includes the message format and message content. The messsage formats of Y1 and Y2 are the same. The message content of Y1 includes one key-value pair, where the key is "location" and the value is "Shenzhen". The message content of Y2 also includes a key-value pair, where the key is "location" and the value is "Guangzhou".

```
<xs:schema  xmlns:xs="http://www.w3.org/2001/XMLSchema"
targetNamespace="http://ngsn.huawei.com/Weather/wsdl/"
elementFormDefault="qualified"c
        <xs:element name="WeatherRequest">
            <xs:complexType>
                <xs:sequence>
                    <xs:element ref="location"/>
                </xs:sequence>
            </xs:complexType>
        </xs:element>
        <xs:element name=" location ">
            ...
        </xs:element>
</xs:schema>
```

Assume that the message is carried over the Session Initiation Protocol (SIP).

(1) Y1 extracts the service logical address (weather@huawei.com), service physical address (weather@10.1.1.1), and message rule (including message format and message content), and sends a service registration request to the home service router R1.

The message header is as follows:

```
REGISTER sip: huawei.com SIP/2.0
To: Bob <sip: weather@huawei.com >
From: Bob <sip: weather@huawei.com >
Contact: < weather@10.1.1.1>
```

The message body includes two parts. One is message format and the other is message content. An example is as follows:

```
<xs:schema...>
...
</xs:schema>
<content>
<location>Shenzhen</location>
<content>
```

(2) After the home service router R1 receives the registration message, R1 extracts the service logical address, service physical address, and message rule to register routing information. The registered routing information is as follows:

| Service Logical Address | Service Physical Address | Message Format | Message Content |
|---|---|---|---|
| Weather@huawei.com | etour@10.1.1.1 | & | Location = "Shenzhen" |

After the service provider Y2 also registers routing information with the router, the routing information is updated as follows:

| Service Logical Address | Service Physical Address | Message Format | Message Content |
|---|---|---|---|
| Weather@huawei.com | etour@10.1.1.1 | & | Location = "Shenzhen" |
| Weather@huawei.com | etour@20.1.1.1 | & | Location = "Guangzhou" |

(1) Assume that the service requestor requests access to the Shenzhen weather forecast service. The service request carries the service logical address weather@huawei.com and the message content, for example:

```
INVITE sip: Weather@huawei.com SIP/2.0
To: Weather <sip: Weather@huawei.com>
From: user <sip:user@cmcc.com>
```

The information example in the SIP message body is as follows:

```
<wsdl:WeatherRequest
soapenv:encodingStyle="http://schemas.xmlsoap.org/soap/encoding/
">
    <location>Shenzhen</location>
</wsdl:WeatherRequest>
```

(2) The home service router R1 of the weather forecast service receives the request message and queries the routing table according to the service logical address weather@huawei.com in the service request to obtain two routing records.

(3) Assume that the router is set to matches the routing information according to the message format and message content in the message rule. The router extracts the message format information and message content information in the routing records and compares both of the information with the request message to obtain one record that matches the message rule as follows:

| | | | |
|---|---|---|---|
| Weather@huawei.com | etour@10.1.1.1 | & | Location="Shenzhen" |

(4) The router extracts the service physical address in the routing record. The router routes the message to Y1 according to the physical address.

(5) Y1 receives the service request and provides the weather forecast service to the service requestor.

In the embodiment of the present invention, a service registration request that carries the logical address, physical address, and message rule of the service is received from a service provider, where the message rule of the service includes at least one of the following parameters: message format and message content; routing information is registered according to the service registration request; and the request message of a service requestor is routed according to the routing information. Therefore, routing of the request message of a service requestor according to the logical address, physical address, and message rule of the service may be implemented, so that routing is more flexible and more convenient.

Those skilled in the art understand that all or part of the steps in the methods provided by the foregoing embodiments of the present invention may be implemented by hardware under the instruction of a program. The program may be stored in a computer readable storage medium, such as a read only memory (ROM), a random access memory (RAM), a magnetic disk, or a compact disk-read only memory (CD-ROM).

The routing method and system for the present invention have been described in detail through exemplary embodiments, which, however, are only intended to help to understand the method and core idea of the invention. It is apparent that those skilled in the art may make various modifications and variations to the invention without departing from the scope of the invention. Therefore, the specification shall not be construed as a limitation to the invention.

What is claimed is:

1. In a router configured to route service, a method for routing service, comprising:

receiving, from a service provider, a service registration request which carries a service logical address, a service physical address, and a message rule;

extracting the service logical address, the service physical address, and the message rule as routing information;

receiving a service request message of a service requestor;

generating a routing record list including routing information that matches a service logical address of the service request message;

determining routing records whose message rule matches the service request message;

selecting one routing record from the matched routing records;

routing the service request message to a service provider corresponding to a service physical address included in the selected routing record;

if the service registration request carries only the service logical address and service physical address, deleting routing information corresponding to the service logical address and service physical address;

if the service registration request carries only the service logical address, service physical address, and service instance identifier, deleting routing information corresponding to the service logical address, service physical address, and service instance identifier; and if the service registration request carries only the service logical address, service physical address, service instance identifier, and message identifier, deleting routing information corresponding to the service logical address, service physical address, service instance identifier, and message identifier.

2. The method of claim 1, wherein determining routing records whose message rule matches the service request message comprises:
determining routing records where the message content in the message rule matches the message content of the service request message;
locating corresponding fields in the service request message according to key in key-value pairs of the message content of the routing records and determining values of the corresponding fields; and
if values in the key-value pairs of the message content of a routing record are consistent with the values of the corresponding fields, determining that the message content of the routing record matches the message content of the service request message.

3. The method of claim 1, wherein, if the service registration request is forwarded by a visited router, the service registration request further carries information of the visited router, the routing record comprises information of the visited router; and
the service request message is routed to the service provider via the visited router according to the visited router information in the matched routing record.

4. A router for routing service, comprising:
a receiver, a processor, and a non-transitory computer readable storage medium functionally coupled to the processor and storing computer executable instructions;
wherein the receiver is configured to receive from a service provider a service registration request which carries a service logical address, a service physical address, and a message rule, and further configured to receive a service request message of a service requestor;
wherein the computer executable instructions, when executed by the processor, cause the terminal device to extract the service logical address, the service physical address, and the message rule as routing information, to generate a routing record list including routing information that matches a service logical address of the service request message, to determine routing records whose message rule matches the service request message, to select one routing record from the matched routing records, and to route the service request message to a service provider corresponding to a service physical address included in the selected routing record; and
if the service registration request carries only the service logical address and service physical address, the processor further causes the terminal device to delete routing information corresponding to the service logical address and service physical address;
if the service registration request carries only the service logical address, service physical address, and service instance identifier, the processor further causes the terminal device to delete routing information corresponding to the service logical address, service physical address, and service instance identifier; and
if the service registration request carries only the service logical address, service physical address, service instance identifier, and message identifier, the processor further causes the terminal device to delete routing information corresponding to the service logical address, service physical address, service instance identifier, and message identifier.

5. The router of claim 4, wherein determining routing records whose message rule matches the request message comprises:
determining routing records where the message content in the message rule matches the message content of the request message;
locating corresponding fields in the request message according to key in key-value pairs of the message content of the routing records and determining values of the corresponding fields; and
if values in the key-value pairs of the message content of a routing record are consistent with the values of the corresponding fields, determining that the message content of the routing record matches the message content of the request message.

6. The router of claim 4, wherein, if the service registration request is forwarded by a visited router, the service registration request further carries information of the visited router, the routing record comprises information of the visited router; and
the service request message is routed to the service provider via the visited router according to the visited router information in the matched routing record.

* * * * *